United States Patent [19]

Bracken

[11] Patent Number: 4,807,393
[45] Date of Patent: Feb. 28, 1989

[54] ROOT BALL CONTAINER AND METHOD

[76] Inventor: Ray Bracken, 720 Latham Rd., Easley, S.C. 29640

[21] Appl. No.: 214,868

[22] Filed: Jul. 5, 1988

Related U.S. Application Data

[63] Continuation of Ser. No. 17,639, Feb. 24, 1987.

[51] Int. Cl.⁴ ............................................. A01G 23/04
[52] U.S. Cl. ........................................... 41/76; 47/78
[58] Field of Search ......................... 47/19, 66, 76, 78

[56] References Cited

U.S. PATENT DOCUMENTS 3,316,675  5/1967  Cartwright Jr. ................. 47/76
4,403,447  9/1983  Braun ............................. 47/76

Primary Examiner—Richard J. Johnson
Assistant Examiner—Charles H. Sam
Attorney, Agent, or Firm—Bailey & Hardaway

[57] ABSTRACT

A star-shaped root ball container constructed of a single wire with loops forming an odd number of points is illustrated together with the apparatus and method for making same.

5 Claims, 5 Drawing Sheets

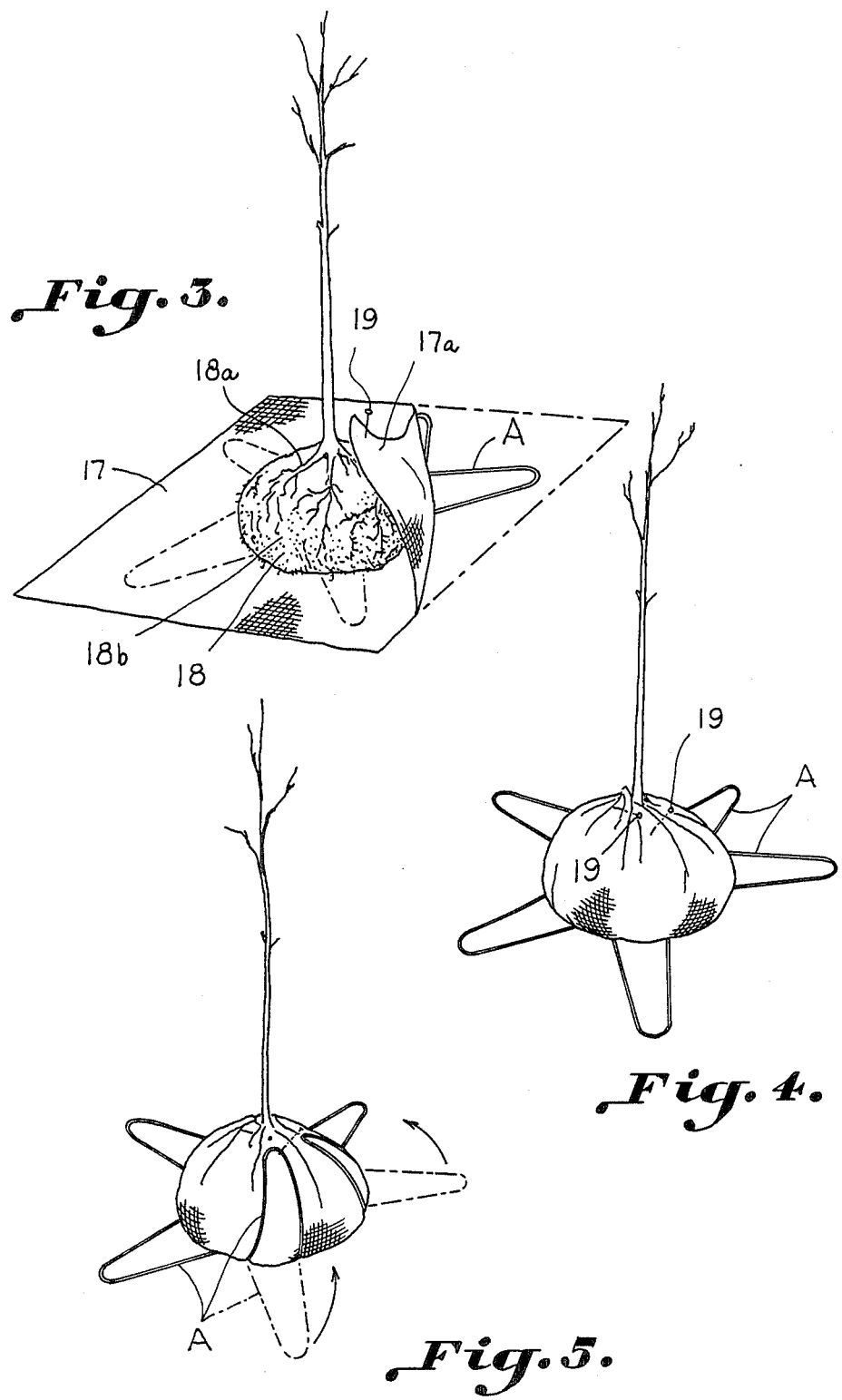

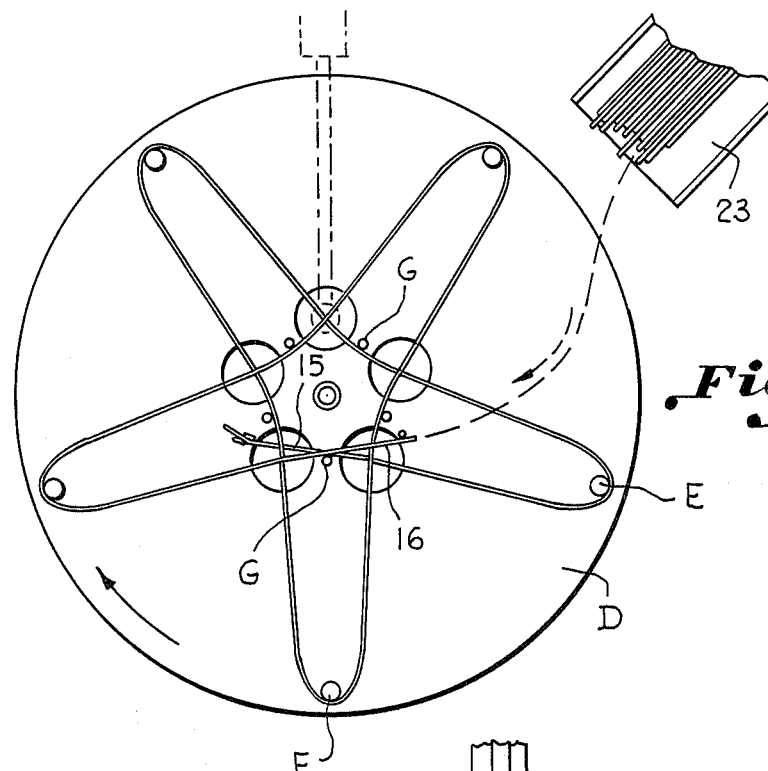
Fig. 10.
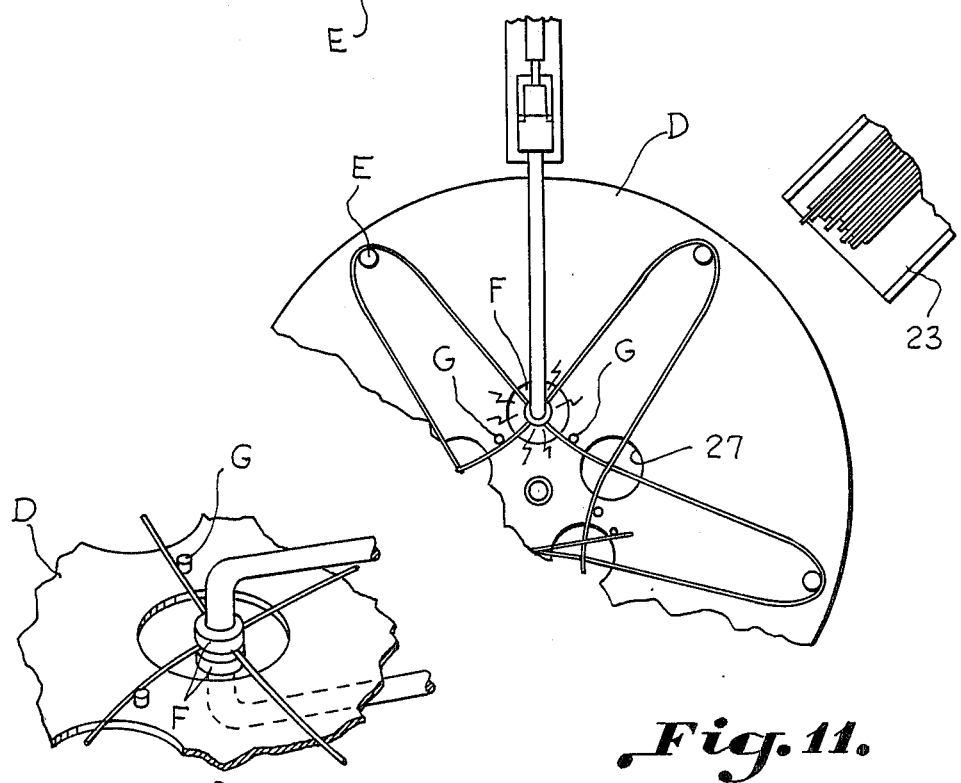
Fig. 11.
Fig. 12.

4,807,393

ROOT BALL CONTAINER AND METHOD

This application is a continuation of application Ser. No. 017,639 filed Feb. 24, 1987.

BACKGROUND OF THE INVENTION

In the plant nursery business root balls of trees and shrubs are generally wrapped for shipping in sheet material such as burlap which is laced about with rope or cord. If the plants are dug by a machine, the root balls are of the same size. However, when plants are dug by hand as is common practice, the root balls vary in size so that a three dimensional container is probably not able to snuggly receive the hand dug plants.

Wire baskets constructed of a single continuous wire strand are illustrated in U.S. Pat. No. 4,478,260. These wire baskets are three dimensional having a tubular cage with helical coils wrapped thereabout. Such baskets are difficult to ship and are generally not adaptable to root balls which vary somewhat in size as do hand dug root balls. The baskets are of a relatively complicated construction requiring the expenditure of considerable material and labor.

The use of a flat generally star-shaped basket is illustrated in U.S. Pat. No. 3,316,675 wherein wire loops are spaced about and connected to central wire support constructed from a separate wire strand. Such a construction is again relatively expensive.

A wire basket is currently marketed which employs elongated wire loops each constructed of a separate wire which is butt welded. The individual loops are then stacked forming a point at each end and welded at overlying central junctures to form a central support from which the points formed by the free ends of the loops are carried. Such baskets have the disadvantage of being costly to manufacture, and the butt welds often fail so that the loops come undone.

An important object of this invention is the provision of a wire container for a root ball of a plant of simplified construction employing a single continuous wire strand resulting in a generally star-shaped basket which is flat for convenient use and shipment.

A further object of the invention is the provision of a wire support basket capable of snuggly containing various sizes of root balls especially such as occurs with hand dug plants where root ball sizes may not be readily controlled.

Another important object of the invention is the provision of a method of manufacturing a wire container for the root ball of a plant wherein a continuous wire strand is fed to a loop forming apparatus where overlapping central portions are joined by welding to join a central support for the points of the basket.

Another important object of the invention is the provision of apparatus for forming a star-shaped container for a root ball wherein an odd number of loops are formed by alternately skipping alternate loop forming support pins carried upon a planar support preparatory to welding overlapping junctures of the loop to form a central support.

The baskets thus formed are utilized together with the usual burlap sheet to form a root ball by turning up and joining the free ends of the star by the use of a tie to snuggly position the basket upon the root ball.

SUMMARY OF THE INVENTION

It has been found that a wire container for a root ball may be readily manufactured utilizing a single continuous strand forming an odd number of overlapping loops which are then joined at overlapping portions by spot welding to form a flat star-shaped basket, the points of which may be turned upwardly about the root ball and interlaced by a tie passing through the free ends of the points.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 3 is a perspective view illustrating a succeeded step in the covering of a root ball wherein the burlap bag is turned upwardly at the corner, FIG. 4 is a perspective view illustrating a further step in the covering of a root ball wherein the burlap has been secured at the top about the root ball, FIG. 5 is a perspective view further illustrating the formation of a root ball for a plant having a burlap cover and wire basket in accordance with the invention wherein two of the wire points have been turned up about the burlap, FIG. 10 is a perspective view illustrating a final loop forming step in the construction of the basket, FIG. 11 illustrates spot welding of the juncture of the loops forming a central support for the points, and FIG. 12 is a perspective view further illustrating the spot welding of the junctions of the single wire strand.

DESCRIPTION OF A PREFERRED EMBODIMENT

The drawings illustrate a wire container for a root ball of a plant which includes an odd number of substantially flat loops. A point A is formed by each loop being closed at its free end. A support B is formed of the loops joined in a configuration positioning said points in circumferentially spaced relation extending radially outwardly thereof. The loops including the points and the support are formed by a continuous strand having overlapping junctures C wherein superposed strand portions are joined together in a substantially flat configuration. Thus, when positioned for containment of the root ball, the continuous strand overlaps itself beneath the root ball and the points and the support formed from the continuous strand may be drawn about said root ball and snuggly secured thereabout.

Preferably, there are five loops and the strand is a continuous metallic wire wherein the superposed portions are spot welded.

The method of making the wire container on a flat rotary support contemplates successively forming a plurality of flat wire loops having superposed junctions by continuously feeding a single wire while rotating the support in predetermined increments. Then the wire loops are welded at the superposed junctions.

Apparatus for forming a wire structure having an odd number of substantially flat loops having closed points and overlapping junctures includes a flat rotary support D. A plurality of circumferentially spaced pins E are carried by the flat rotary support receiving the closed points, and means F is provided for welding the overlapping junctures.

The rotary support has openings opposite the overlapping junctures to accommodate a spot welder. A plurality of circumferentially spaced pins G are carried centrally of the table opposite the first mentioned pins E.

Figure 1:
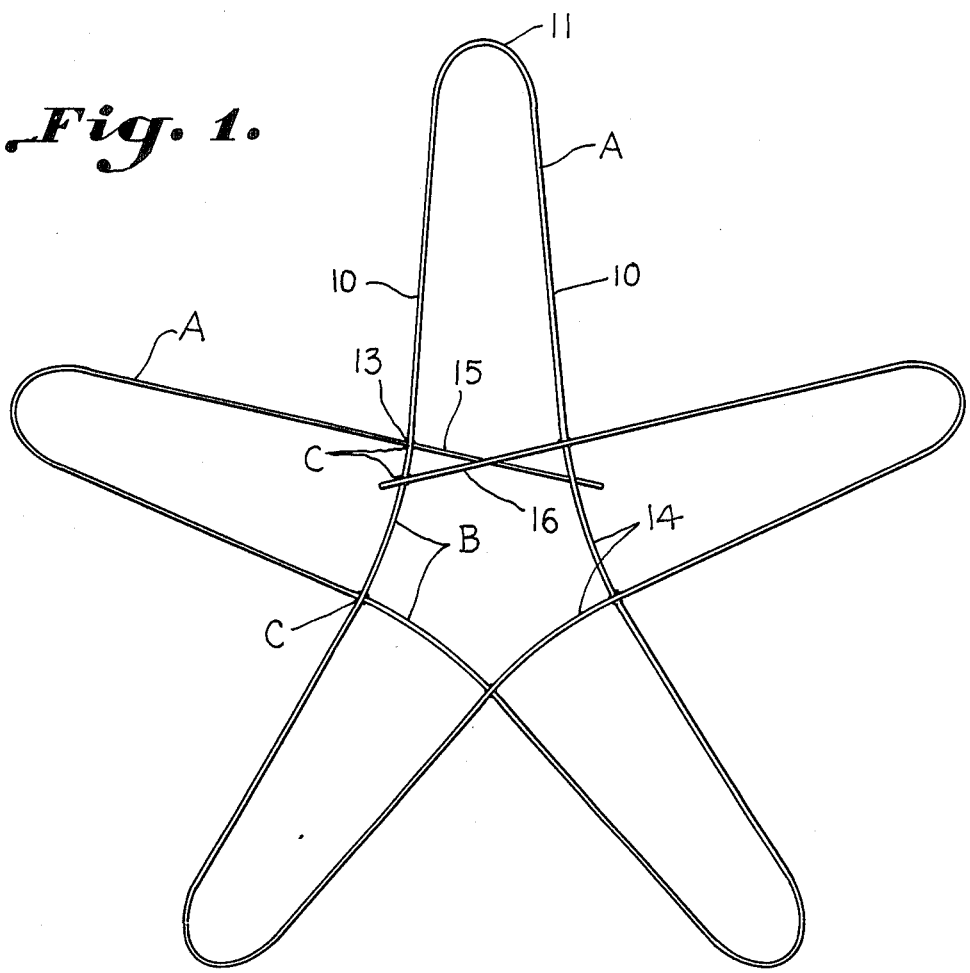
FIG. 1 is a plan view of a flat continuous wire basket having overlapping looped portions which are welded together in five pointed configuration in accordance with the invention.
Figure 2:
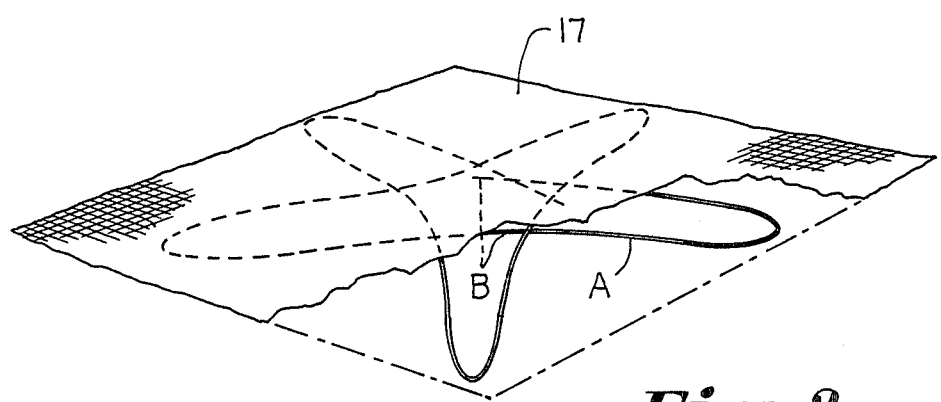
FIG. 2 is a perspective view illustrating a wire basket constructed in accordance with the invention having the usual burlap sheet superposed thereon preparatory to covering a root ball of a plant.

Referring to FIGS. 1 and 2, a wire container is illustrated having an odd number of circumferentially spaced points A carried by a central support B. The points A have sides 10 which are illustrated as converging slightly toward the free ends which have closed substantially U shaped bights 11. The sides 10 are flexed inwardly and together with adjacent points form superposed the junctures C which are welded as at 13. It will be noted that the overlapping of superposed wire portions forming the junctures C are placed above or below as dictated during construction as will be described below.

The wire segments forming the central support portions B are flexed inwardly as illustrated at 14 as are the beginning segments 15 and terminal segments 16.

FIG. 2 illustrates the first step in the formation of a root ball utilizing the container of the invention. A flat container having points A carried by the central support B may be placed on the ground and covered by the usual burlap sheet 17. One corner of the burlap sheet is raised around the root ball 18 which consists of plant roots 18a together with the growing medium 18b. The root ball 18 may be of the type which is hand dug by a nurseryman or of the machine dug variety. The corner 17a, which is raised in FIG. 3, is then pierced by the usual fastening nail 19, and as shown in FIG. 4. The other corners of the burlap sheet 17 are raised and joined by fastening nails 19 in the customary fashion.

Figure 6:
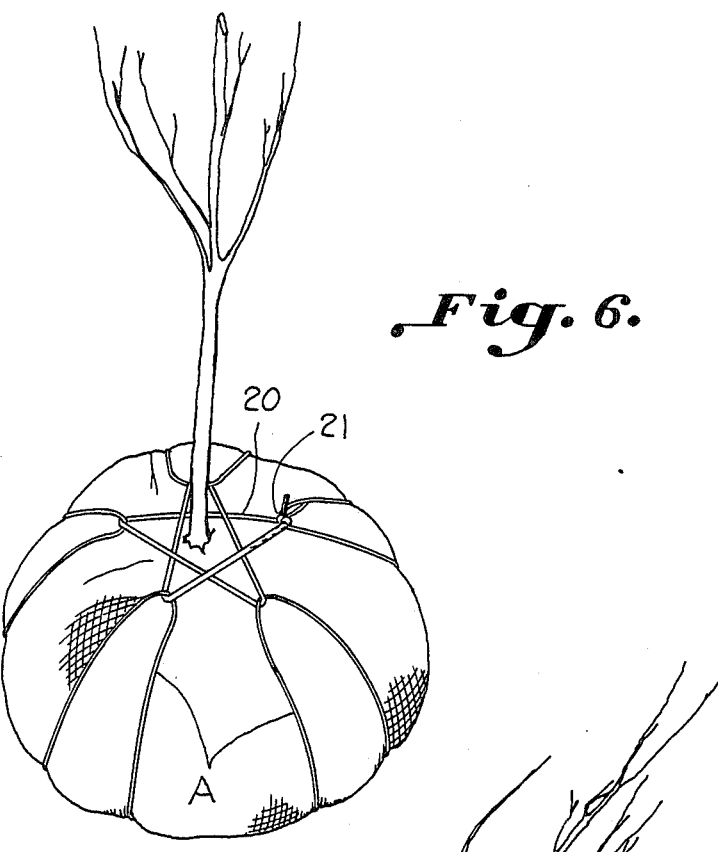
FIG. 6 illustrates the final root ball having a burlap basket wherein the points of the wire basket are laced together by a tie in a five-pointed star configuration.
Figure 7:
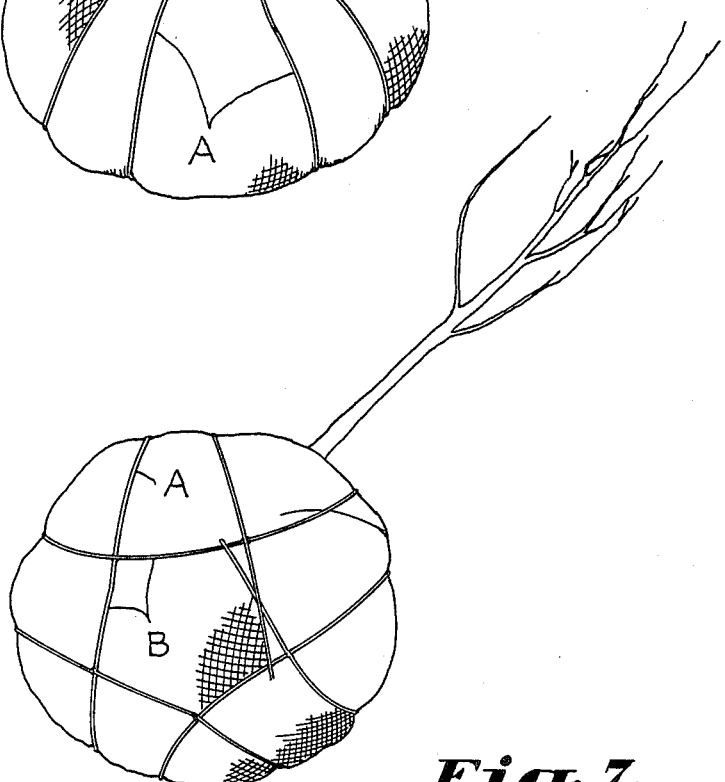
FIG. 7 is a perspective view of the root ball and basket looking toward the bottom illustrating the central support for the points of the basket.
Figure 8:
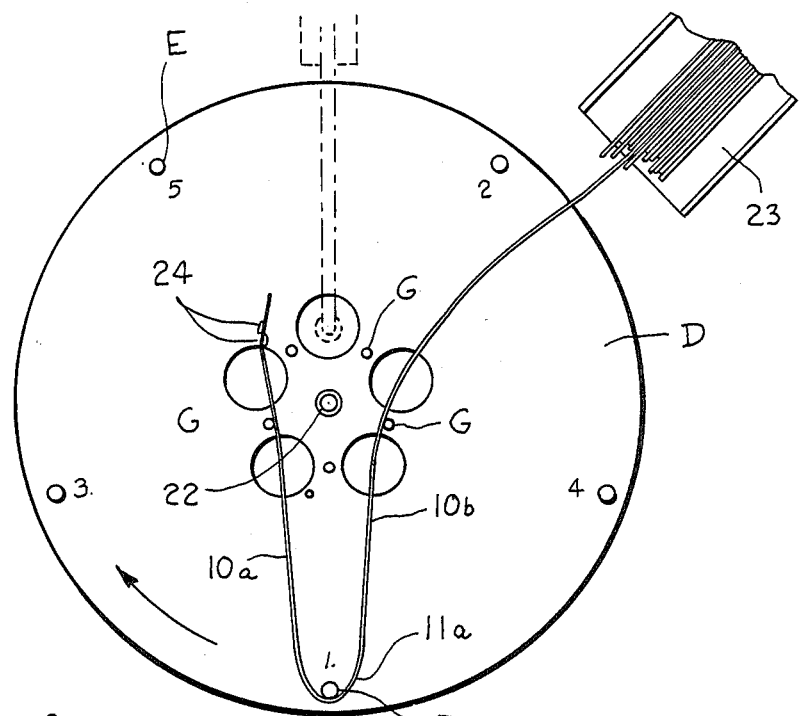
FIG. 8 is a plan view illustrating a rotatable table having circumferentially spaced pins formed in inner and outer series for looping the wire forming a basket in accordance with the present invention.

As illustrated in FIG. 5, the points A of the generally star-shaped basket are raised, and FIG. 6 illustrates interconnecting the corners as by a tie 20 which is secured as at 21. The tie is looped through alternate points as shown in FIG. 6 to form a generally star-shaped configuration which is most effective in forming the snug relationship between the basket and the root ball container within the burlap sheet. If desired, however, the points of the basket may simply be connected serially by a suitable tie (not shown). FIG. 7 shows the lower portion of the root ball and plant illustrating the support member B which forms a bottom of the assembly.

FIGS. 8 through 12 illustrate the apparatus and method of making the wire containers illustrated in FIGS. 1 through 7.

The apparatus includes a flat rotary support D in the form of a round table having a central hub 22 about which the table is mounted for rotary motion. In the apparatus illustrated rotary motion is imparted by the operator to a peripheral portion of the table which is mounted for freewheeling about the hub 22.

The wires are continuously fed from a chute 23 to the loop forming apparatus which includes the rotary table and a first series of circumferentially spaced pins E. In addition, a second series of inner circumferentially spaced pins are illustrated at G. A gripper for holding a starting end of wire is provided by spaced vertical projections 24. The wire is continuously fed from the trough 23 in a first length 10a, inwardly of one of the second series of pins G flexing inner portions of the loops as at 14 about one of the first series of pins E, numbered 1 in FIGS. 8 and 9, forming a closed end having a bight 11a. An additional length of wire is fed by the operator to a pin E which is numbered at 2 skipping the alternate pin which is numbered 4. The length of wire 10b passes inwardly of an intermediate pin of the second series of spaced pins G skipping an alternate pin G.

Figure 9:
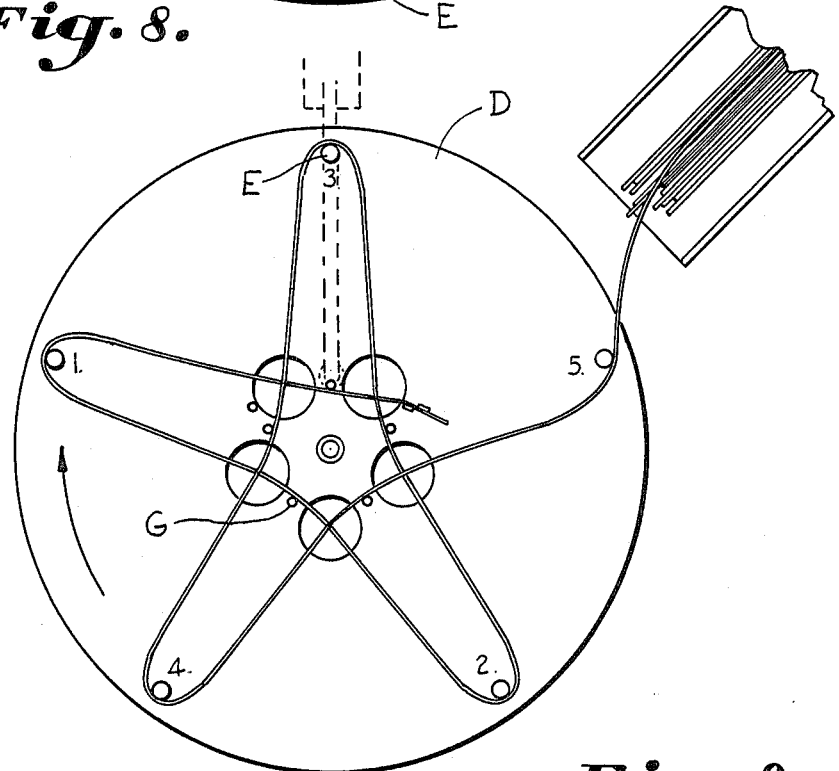
FIG. 9 is a plan view further illustrating the method of forming a basket in accordance with the present invention.

FIG. 9 further illustrates the formation of generally star-shaped wire baskets wherein the points are formed by continuously feeding the wire successively about pins 3, 4 and 5 and inwardly of respective pins of the second series G, skipping alternate pins of the series E as well as the series G while incrementally advancing the table in the direction of the arrow. Referring to FIG. 10, the beginning end is illustrated at 15 while the opposite or terminal segment is illustrated at 16. This may be accomplished by utilizing wires of a given continuous length or a continuous length of wire such as may be delivered from a coil and which may be cut preparatory to making another container. While a single uninterrupted length of wire for each basket is not essential, it is desirable that a continuous length be employed so that several adjacent loops may be formed of a single length to minimize labor and for better quality. The ends or segments 15 and 16 may be trimmed of excess wire preparatory to or after the welding of the junctures of the wire.

The welding apparatus is best illustrated in FIGS. 11 and 12 wherein opposed electrodes F may be utilized, and as illustrated the lower electrode passes through a series of circumferentially spaced openings 27 carried in the table D adjacent each of the junctures C for joining the overlapping portions of the wire. Each overlapping portion of the wire is spot welded while the table is rotated in incremental amounts by the operator to facilitate engagement of the electrodes which may be conveniently operated by a conventional foot operating mechanism (not shown). Each overlapping portion of the wire is welded except for the interconnecting juncture between the segments 15 and 16 as might best be seen in FIG. 1. If desired all the welds may be accomplished in a single motion if multiple welding heads are provided.

While a preferred embodiment of the invention has been described using specific terms, such description is for illustrative purposes only, and it is to be understood that changes and variations may be made without departing from the spirit or scope of the following claims.

What is claimed is:

1. A container for a root ball of a plant comprising:

continuous strand forming an odd number of substantially flat loops;

a point formed by each loop being closed at its free end opposite a base portion;

a flat support formed by said continuous strand having said base portions of said loops joined together wherein said points are in circumferentially spaced relationship extending radially outwardly thereof; and wherein said continuous strand joins said base portions of said loops by overlapping junctions wherein superposed strand portions are joined together in a substantially flat configuration;

thereby forming said loops including said points and said support;

whereby said points and said support formed from the continuous strand overlapping itself beneath the root ball may be drawn about said root ball and snuggly secured thereabout.

2. The structure set forth in claim 1 wherein said loops are wire and being five in number.

3. The structure set forth in claim 2 wherein said strand is metallic wire, and wherein said superposed portions are spot welded.

4. A root ball of a plant having a container comprising:

a wire basket formed in substantially flat configuration from a continuous strand having circumferentially spaced loops closed at respective free ends forming a plurality of spaced points each opposite a base portion and carried by a central support formed from said base portions of said loops;

the base portions of said central support being welded in superposed relationship opposite said points; and a tie connecting each of said points pulling said basket snuggly about the root ball.

5. The structure set forth in claim 4 wherein said basket has five points and wherein said tie is looped through said points skipping alternate points forming a five pointed star.

* * * * *